United States Patent [19]
Read et al.

[11] Patent Number: 5,541,603
[45] Date of Patent: Jul. 30, 1996

[54] REDUCED RADAR CROSS-SECTION RF SEEKER FRONT-END

[75] Inventors: William E. Read; Ralph H. Halladay, both of Huntsville, Ala.

[73] Assignee: The United States of America as represented by the Secretary of the Army, Washington, D.C.

[21] Appl. No.: 488,801

[22] Filed: Jun. 8, 1995

[51] Int. Cl.$^6$ .................................. G01S 7/36; G01S 7/38
[52] U.S. Cl. ............................ 342/13; 342/19; 342/188; 342/198
[58] Field of Search ........................ 342/13, 1, 2, 3, 342/4, 11, 188, 16, 19, 198

[56] References Cited

U.S. PATENT DOCUMENTS

| | | | |
|---|---|---|---|
| H1033 | 3/1992 | Willey et al. | 342/17 |
| 4,208,126 | 6/1980 | Cheo et al. | 356/51 |
| 4,743,904 | 5/1988 | Morton et al. | 342/14 |
| 5,289,434 | 2/1994 | Berni | 367/178 |
| 5,317,383 | 5/1994 | Berni | 356/351 |

*Primary Examiner*—John B. Sotomayor
*Attorney, Agent, or Firm*—Anthony T. Lane; Freddie M. Bush; Hay Kyung Chang

[57] ABSTRACT

A Reduced Radar Cross-Section RF Seeker Front-End interrogates a potential target by issuing interrogation radiation toward the target and receiving and analyzing a portion of the radiation that reflects back from various surfaces of the targeted object while, at the same time, the Front-End reduces the likelihood of its own discovery by the enemy. The Front-End accomplishes the reduction by absorbing radiation directed toward it by an enemy radar or anti-tactical missile rather than allowing the radiation to be reflected back. Such absorption greatly diminishes the availability of signature reflection that belligerents rely on to identify hostile forces on the battlefield.

9 Claims, 4 Drawing Sheets

REDUCED RADAR CROSS-SECTION RF SEEKER FRONT-END

DEDICATORY CLAUSE

The invention described herein may be manufactured, used and licensed by or for the Government for governmental purposes without the payment to us of any royalties thereon.

BACKGROUND OF THE INVENTION

Radar cross-section (RCS) is defined as the portion of radiated power that is incident upon a target and is reflected from the target toward the receiving antenna of the radar that originally transmitted the power. The RCS of a targeted missile is composed of contributions from many scatterers of the missile body and aerodynamic surfaces. However, the predominant scatterer for the nose-on and near nose-on missiles is the seeker antenna and the seeker-antenna interface where the collected energy is coupled from the antenna to the seeker receiver. Hence, RCS reduction of a tactical missile would greatly reduce the effectiveness of a defense radar or anti-tactical missile that attacks the tactical missile using the ratio of the received target energy to noise spectral density. By reducing the amount of backscattered energy available from the targeted tactical missile to the radar or radar-guided anti-tactical missile, the ability of the radar or radar-guided anti-tactical missile to acquire and guide to the targeted tactical missile is likely to be severely eroded.

SUMMARY OF THE INVENTION

The Reduced Radar Cross-Section RF Seeker Front-End is capable of dual functions, i.e., interrogate a potential enemy missile (offensive function) and provide protection against discovery by the enemy missile (defensive function). The latter function is accomplished by reducing its own RCS, thereby decreasing the effectiveness of enemy anti-tactical missile systems. Reducing the RCS of a tactical missile severely degrades the acquisition and tracking performance of radar-based defense systems that are used in countering such a tactical missile. The RCS reduction is accomplished by reflecting the RF energy that is incident on tactical missile into absorbers which are comprised of radar absorbing material (RAM) rather than allowing the incident radar energy to be scattered back to the original source of the energy, i.e., the enemy defense systems. The absorber cooperates with a grid polarizer, a polarization rotator and a duplexer to the transmit-and-receive components to reduce the over-all RCS available to the enemy radar defense systems.

The Reduced Radar Cross-Section RF Seeker Front-End (RCS RF Seeker Front-End) offers the potential for all-weather operation for tactical weapon systems in both land combat and air defense roles. The effectiveness of an attacking tactical weapon system can be significantly enhanced by degrading the ability of a defense radar or defensive missiles to detect and/or track the attacking weapon. Potential applications of the subject invention are in most active RF seekers, including CORPS SAM, ERINT, LONGBOW, ADKEM, MLRS-TGW and ENDO-LEAP. The subject invention also has potential applications in low-signature aircraft, ground based radar and electronic countermeasure (ECM) systems.

DESCRIPTION OF THE DRAWING

For a better understanding of the invention and to show how the same may be carried into effect, reference is made, by way of example, to the accompanying drawing in which.

DETAILED DESCRIPTION OF THE INVENTION

Referring now to the figures wherein like numbers represent like parts and the various parts are optically linked to each other, the structure and operation of RCS RF Seeker Front-End 100 is explained.

Figure 1:
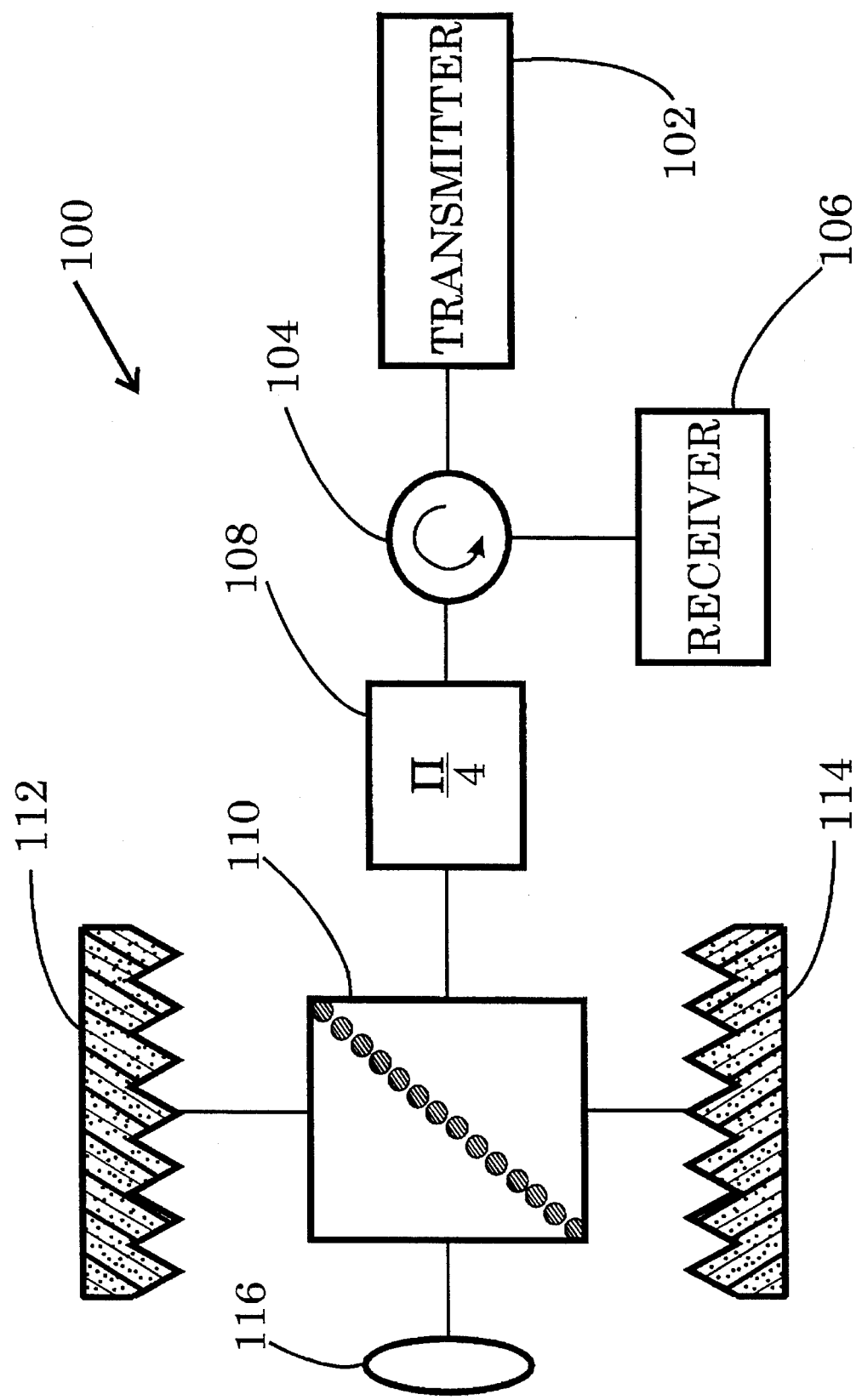
FIG. 1 is a diagram of the preferred embodiment of the invention.
Figure 2:
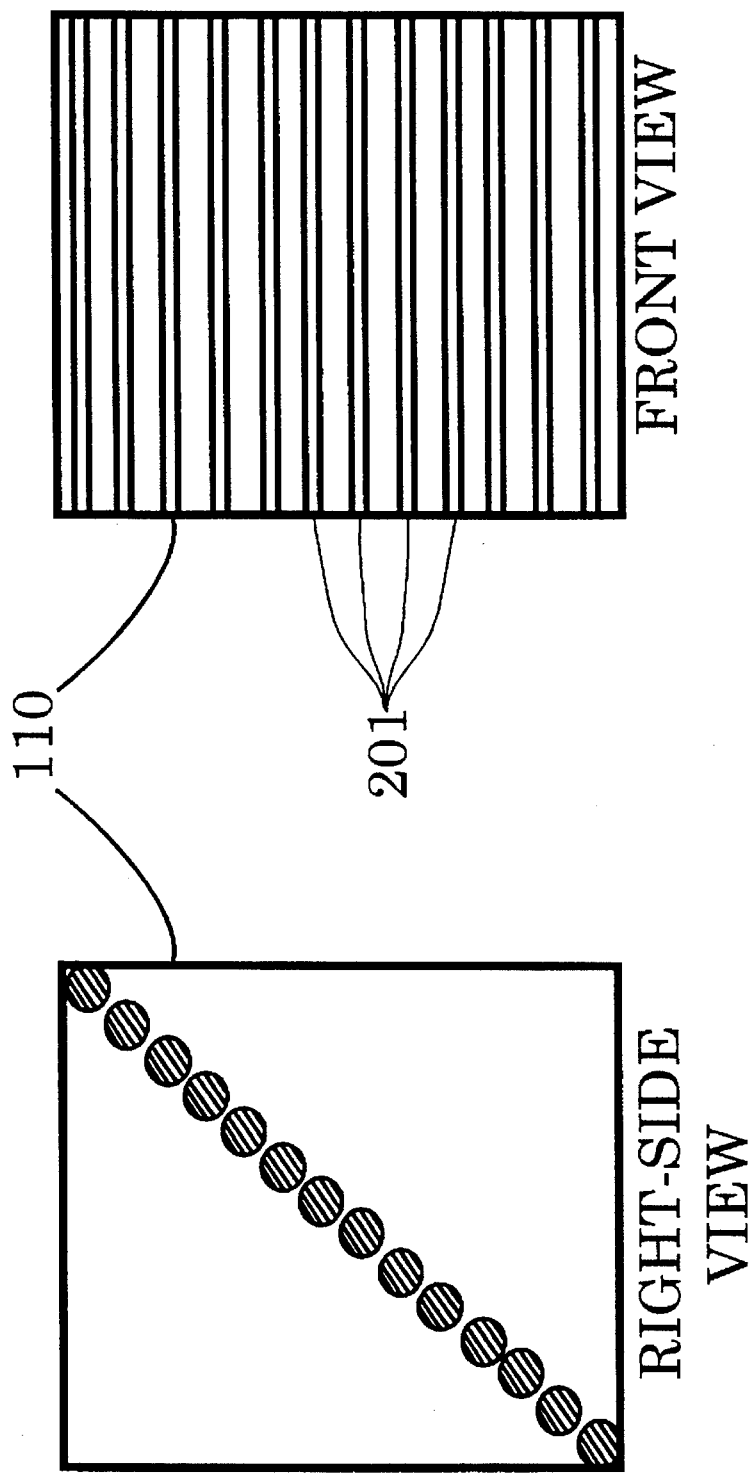
FIG. 2 shows the right-side and front views of the grid polarizer.

Transmitter 102 generates and emits outgoing interrogation radiation which passes through duplexer 104, polarization rotator 108 and grid polarizer 110 before being collimated by lens 116 and transmitted thereby toward a potential target. A portion of the interrogation radiation thusly transmitted is expected to be reflected by various surfaces of the potential target. This reflected radiation reenters the Front-End via lens 116, being collected and focussed thereby, and further travels through the grid polarizer and the polarization rotator. Then duplexer 104 routes this incoming, reflected radiation to be incident on receiver 106 which performs appropriate signal processing on the reflected radiation to identify the potential target. Absorbers 112 and 114 are positioned with respect to grid polarizer 110 so as to absorb any radiation reflected by the grid polarizer. FIG. 2 shows a side view and a front view of a grid polarizer having a horizontal polarization orientation as indicated by horizontal grid bars 201. A vertically polarized signal passes through such a grid polarizer while a horizontally polarized signal is reflected by it. The horizontally polarized signal that is reflected by the grid polarizer is incident upon and absorbed by absorbers 112 and 114.

Figure 3:
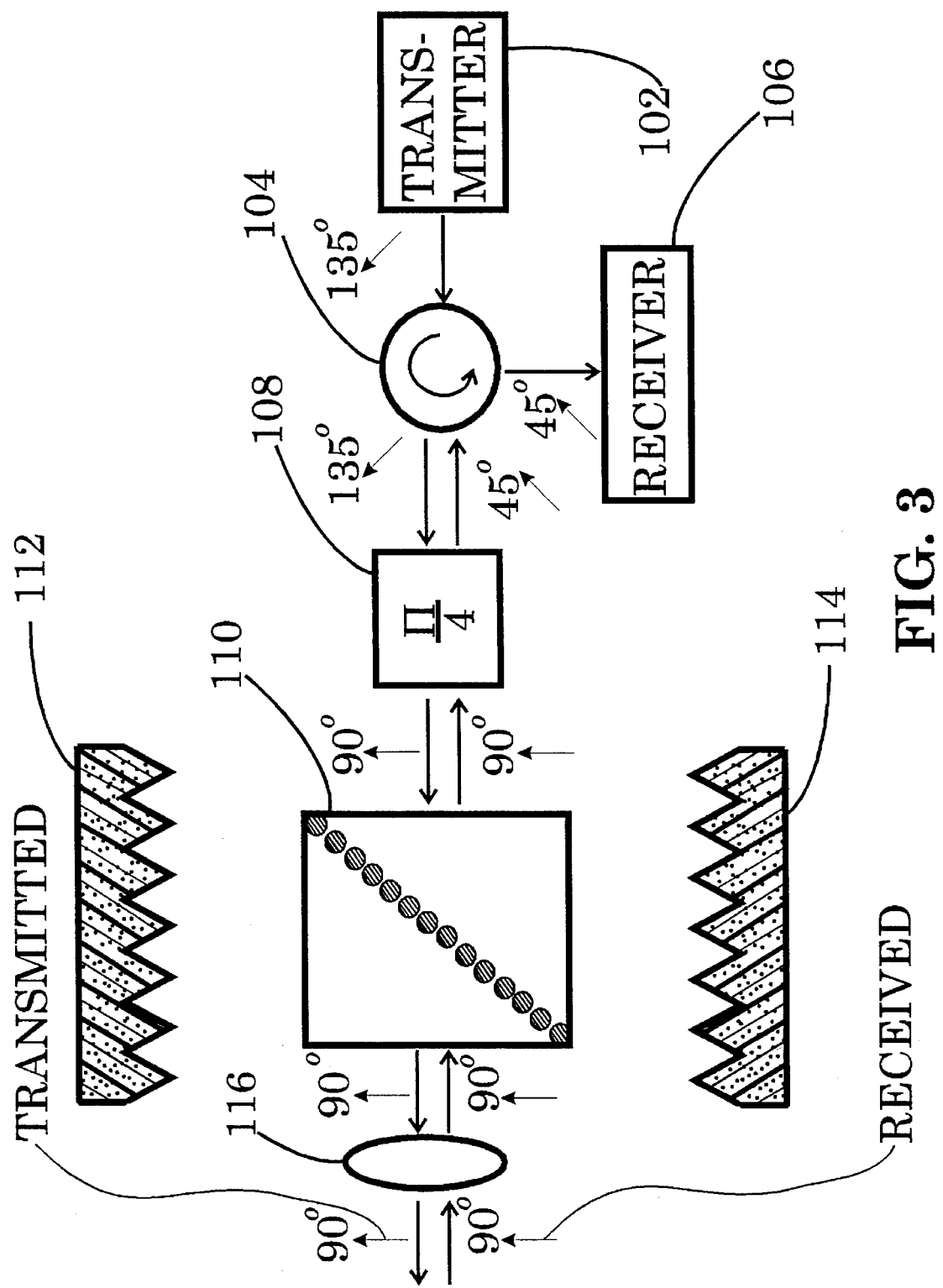
FIG. 3 illustrates the offensive function of the RCS RF Seeker Front-End.

The Front-End is capable of functioning in offensive and defensive modes. In the offensive mode, as illustrated in FIG. 3 where the line-head arrows indicate the directions of optical travel while the solid-head arrows denote the polarization of the travelling radiation, transmitter 102 of the Front-End sends out interrogation radiation having a polarization of 135°. The radiation passes through duplexer 104 without a change in its polarization angle and impinges on polarization rotator 108. The rotator, which may comprise a quarter-wave plate, then, rotates the polarization angle of the outgoing interrogation radiation by 45° thereby causing the polarization angle of the interrogation radiation to be vertical (90°). The now-vertically-polarized interrogation radiation passes through horizontally-polarized grid polarizer 110 with sustained polarization and proceeds to be incident on a potential target. Some portions of the radiation are reflected by the target and return to the Front-End in a predominantly vertical orientation. This vertical orientation of the reflected radiation enables it to pass again through the grid polarizer to be incident on polarization rotator 108. The rotator, once again, rotates the polarization angle of the radiation passing therethrough by 45°. The rotated reflected radiation, now having a polarization orientation of 45°, impinges on duplexer 104 and is directed thereby to receiver 106 which is polarized at 45° for maximum sensitivity.

Figure 4:
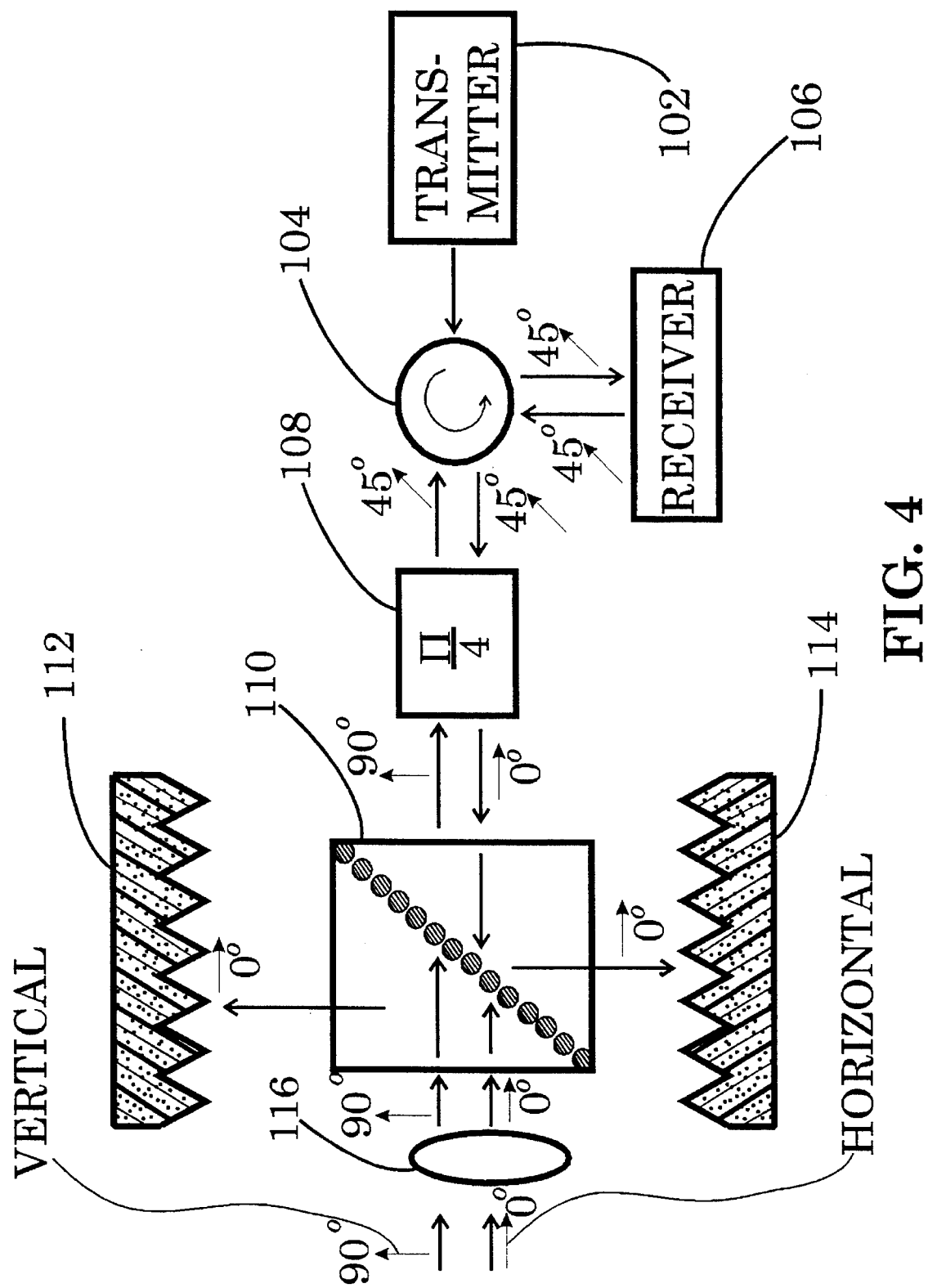
FIG. 4 illustrates the defensive function of the RCS RF Seeker Front-End.

FIG. 4 illustrates the defensive mode in which a tactical missile equipped with Front-End 100 seeks to avoid discovery by a potential enemy. The enemy radar is likely to illuminate the tactical missile with both vertically and horizontally polarized signals. The horizontal component (0°) of the enemy signals is reflected by the grid polarizer as is the horizontal component of any arbitrarily-polarized radiation such as circular or slant linear. The radiation that is reflected by the grid polarizer is absorbed by absorbers 112 and 114 which are located on opposite sides of the grid polarizer, preferably above and below the grid polarizer. Each absorber should be equal to or slightly greater in size than the cross-section of the grid polarizer. The absorbers may be flat panels made of carbon-impregnated fiber mats or pyramids made of carbon-loaded urethane. While the horizontal component of the impinging radiation is reflected by the grid polarizer, the vertical component of the radiation is transmitted through the grid polarizer and rotated by polarization rotator 108 to 45°. It, then, is directed by duplexer 104 to be incident on receiver 106. At this point, if the radiation is within the bandwidth of the receiver, it is coupled into the receiver as interfering signal. If it is out of band, then the radiation is reflected back through the duplexer and rotator where it is rotated an additional 45°thus becoming a horizontal (0°) signal. This horizontal signal then enters the grid polarizer and is reflected into the absorbers, thereby minimizing the reflection of re-radiated signal back to the enemy radar.

The above-described Front-End provides radar cross-section reduction function to the tactical missile, that is equipped with the Front-End, by creating low signal reflection for arbitrarily polarized signals whether in or out of the operating band of the missile.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A radar seeker front-end having a reduced radar cross-section, said front-end comprising:

a grid polarizer for selectively passing therethrough radiation of a given polarization while reflecting radiation of other polarizations; a transmitter for generating and issuing interrogation radiation, said transmitter being positioned to transmit the interrogation radiation to said polarizer for further tansmission toward a potential target; and a means for absorbing radiation, said absorbing means being located relative to said polarizer so as to absorb the radiation reflected by said polarizer, thereby reducing signature reflection available to a potential enemy.

2. A radar seeker front-end as described in claim 1, wherein said front-end further comprises a receiver for receiving and processing radiation signals; a polarization rotator, said rotator being positioned between said transmitter and said polarizer to intercept and rotate the polarization of the interrogation radiation emanating from said transmitter thereby enabling the interrogation radiation to pass through said polarizer toward a potential target; and a duplexer, said duplexer being located such that radiation incoming to said front-end from a potential target is directed by said duplexer only to said receiver.

3. A radar front-end as described in claim 2, wherein said absorbing means comprises at least two absorptive panels, said panels being located on opposing sides of said polarizer.

4. A front-end as described in claim 3, wherein said rotator is a quarter-wave plate.

5. A front-end as described in claim 4, wherein said front-end still further comprises an antenna suitably positioned for receiving the interrogation radiation from said grid polarizer for further transmission toward a potential target and for collecting and focussing incoming radiation from a potential target prior to directing the incoming radiation to said grid polarizer.

6. A front-end as described in claim 5, wherein said antenna is a lens.

7. A front-end as described in claim 6, wherein said absorptive panels are flat and comprise carbon-impregnated fiber mats.

8. A front-end as described in claim 6, wherein said absorptive panels comprise pyramids composed of carbon-loaded urethane foams.

9. A system for reducing the radar cross-section of a seeker missile, said system residing on the missile and comprising:

a source of outgoing radiation; a grid polarizer having a given polarization orientation, said polarizer being positioned to receive the outgoing radiation and transmit the outgoing radiation toward a potential target; a polarization rotator located between said source and said polarizer to intercept the outgoing radiation and rotate the polarization axis thereof in a given direction; a receiver for receiving and processing radiation incoming from outside said system; a duplexer positioned between said rotator, said transmitter and said receiver for directing the incoming radiation only to said receiver and a plurality of absorbers, said absorbers being positioned so as to absorb radiation reflected by said grid polarizer thereby reducing signature reflection available to a potential enemy.

\* \* \* \* \*